UNITED STATES PATENT OFFICE.

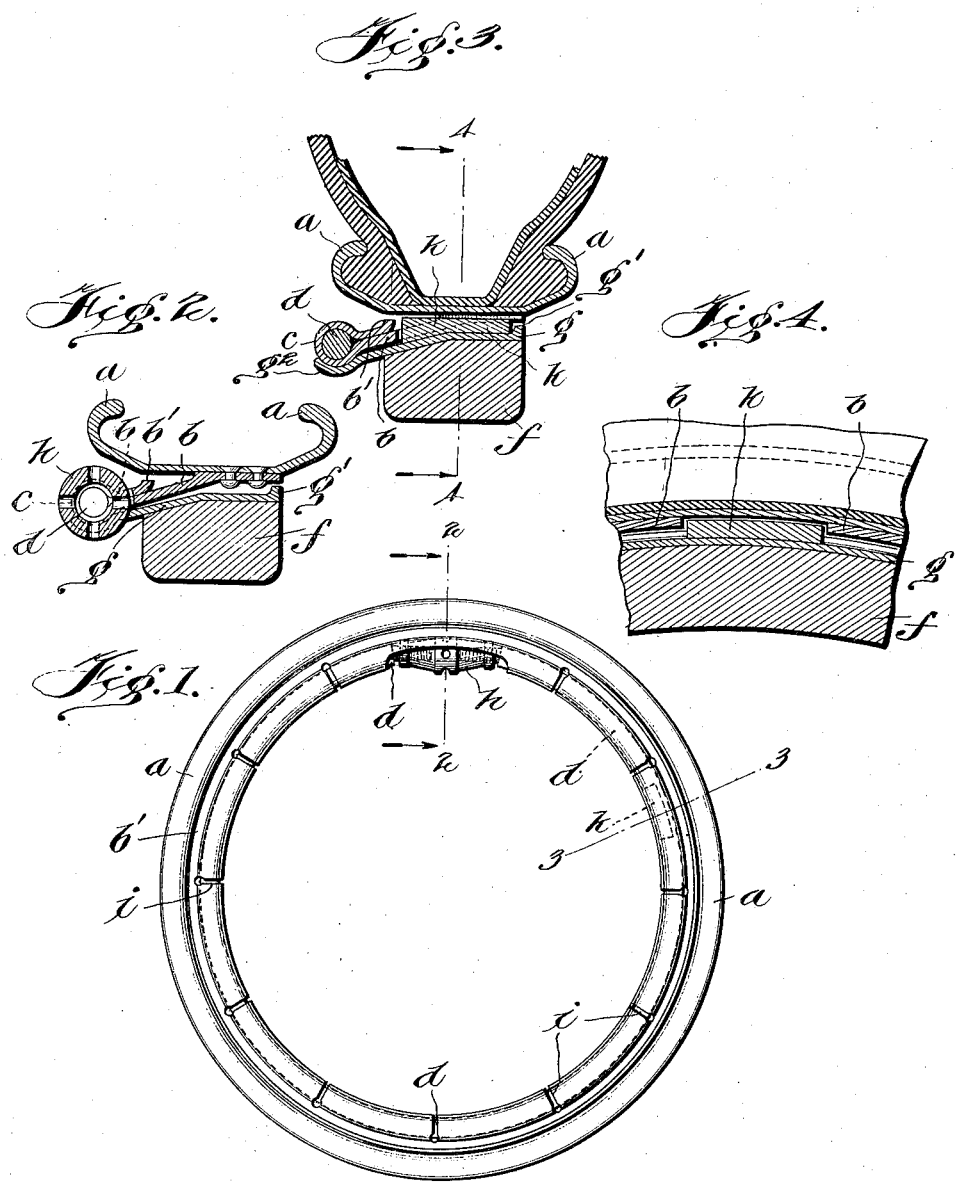

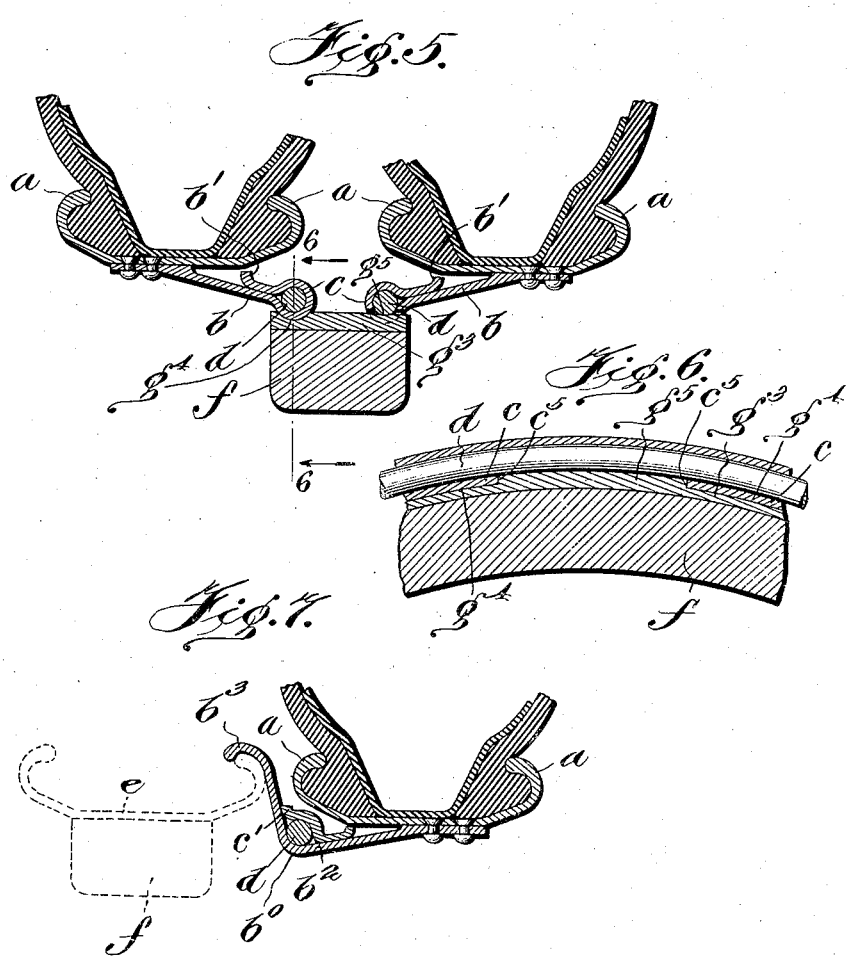

MARC WOLFF, OF CHELSEA, ENGLAND, ASSIGNOR TO MESSRS. MICHELIN & CIE., OF CLERMONT-FERRAND, FRANCE, A CORPORATION OF FRANCE.

DETACHABLE RIM FOR VEHICLES.

1,044,328.      Specification of Letters Patent.      Patented Nov. 12, 1912.

Application filed April 3, 1912. Serial No. 688,218.

*To all whom it may concern:*

Be it known that I, MARC WOLFF, a citizen of the French Republic, residing at Chelsea, in the county of Middlesex, England, have invented certain new and useful Improvements in Detachable Rims for Vehicles; and I do hereby declare the following to be a full, clear, and exact description of the invention, such as will enable others skilled in the art to which it appertains to make and use the same.

This invention relates to improvements in detachable rims, and the combination therewith of wheels adapted to receive said rims, as will be hereinafter more fully described.

According to this invention, a complete and undivided rim is provided with a contractible supporting plate fixed to the base portion of the rim at an angle thereto, and according to this invention the supporting plate is fixed to the said rim throughout its circumference, and has saw cuts formed at suitable intervals apart to give it the required flexibility; its edge is preferably rounded to form a beading, within which is placed a rod adapted positively to expand or contract the free edge of the supporting plate, and so cause the bead to seat itself upon or be removed from a seating carried by the wheel felly.

This construction is particularly applicable to twin tires, as the edges of the supporting plates alone rest upon the wheel felly, the rims overhanging both sides of the same; it will be seen that the felly will not require to be cut away for the purpose of allowing the passage of the valves of pneumatic tires.

The invention also comprises a wheel having a plurality of rims each composed of a complete and undivided detachable rim, and each provided with a supporting plate capable of contracting and expanding.

Reference is had to the accompanying drawings, in which the same parts are indicated by the same letters throughout the several views.

Figure 1 is a front elevation, showing the detachable supporting plate and rim carried thereby detached from the wheel, and without the tire. Fig. 2 shows a cross-section along the line 2—2 of Fig. 1, and looking in the direction of the arrows. Fig. 3 shows a section through the felly of the wheel and the detachable rim and tire, the section through the detachable rim being shown along the line 3—3 of Fig. 1, the figure being especially designed to show a means for locking the rim against circumferential motion. Fig. 4 shows a section along the line 4—4 of Fig. 3, and looking in the direction of the arrows. Fig. 5 shows a cross-section through a felly and felly band, showing the demountable rims used with twin tires. Fig. 6 shows a section along the line 6—6 of Fig. 5, and looking in the direction of the arrows, and Fig. 7 shows a modification in which the demountable rim is adapted to be attached to the rim already on the wheel, for use in cases of emergency.

Referring to Figs. 1 to 6, $a$ is a continuous, undivided rim of the ordinary clencher tire, and $b$ is a supporting plate secured to the rim in any convenient way, and having one edge bent over and turned up, as at $b'$, the bent over edge forming a bead $c$, in which the rod $d$, bent to form a split ring, is inclosed. The upturned edge $b'$ of the supporting plate $b$ serves to engage the inner face of the rim $a$, to limit the expansion. This plate $b$ is provided with a series of cuts from the interior part of the way through, as at $i$, (see Fig. 1) to permit expansion and contraction of the same, and of the ring $d$; and this expansion and contraction is effected in any convenient way, as by means of the right and left-hand screw $h$, shown in Figs. 1 and 2. $f$ is a wooden felly, attached to the spokes (not shown), and $g$ is a steel hoop or felly band permanently attached to the felly, as is well known in the art. In the form of device shown in Figs. 2 and 3, this permanent band $g$ is provided at one edge with an outwardly projecting flange $g'$, to engage beneath the rim $a$, and at the other edge with a grooved channel, adapted to receive the bead $c$ of the plate $b$. In assembling the parts, the part $b$ and ring $d$ are distended by means of the right and left-hand screw $h$, the bead $c$ is slipped over the groove $g^2$, and the parts are contracted by turning the right and left-hand screw in the reverse direction. As a result, the bead $c$ is held firmly in the grooved channel $g^2$. To prevent the rim from circumferential motion on the felly band $g$, any suitable locking arrangement may be provided, such as the key $k$, shown in Figs. 3 and 4, engaging in a recess in the member $b$.

In the form of device shown in Figs. 5 and 6, the felly band $g^3$ is provided with grooves $g^4$, to receive the bead $c$, and the vertical axes of the tires and rims are at opposite sides of, and clear of, the felly, whereby the valve stem (not shown) is clear of the felly, and there is no necessity of perforating the felly to receive said valve stem. In order to prevent circumferential motion, or creeping around the wheel, the bead and the felly band may be mutually cut away, and caused to interlock, as shown in Fig. 6, in which $g^5$ represents a rib separating the two grooves $g^4$, cut into the felly band $g^3$, and in which the bead $c$ is cut away, as at $c^5$, to receive said rib $g^5$.

In the form of device shown in Fig. 7, the contractile supporting plate $b^2$ is bent, as at $b^6$ to receive the bent steel rod $d$, whose contraction or expansion contracts or expands the free edge $b^3$ of the plate $b^2$, which free edge is provided with an annular hook, adapted to engage the rim $e$, shown in dotted lines, mounted on the felly $f$, also shown in dotted lines. Mounted exterior to the rod $d$, is a bracket plate $c'$, secured to the plate $b^2$. The arrangement shown in Fig. 7 is especially intended for use in emergencies, where, the tire on the wheel becoming deflated, it is desired, without removing said tire, to apply an auxiliary tire. The form of demountable rim shown in Fig. 7 is applied to, or removed from, the wheel in a manner similar to that already described with reference to Fig. 1.

It will be obvious that various modifications might be made in the herein described apparatus, and in the combinations and arrangement of parts which could be used without departing from the spirit of my invention.

Having thus described my invention, what I claim and desire to secure by Letters Patent of the United States is:—

1. The combination with a continuous rim, of a supporting plate secured thereto and provided with cuts therein, the said plate being bent to form a bead, a bent rod mounted in said bead, and means for expanding and contracting said rod and bead, substantially as described.

2. The combination with a continuous rim, of a supporting plate secured thereto and provided with cuts therein, the said plate being bent to form a bead, a bent rod mounted in said bead, and a right and left hand screw for expanding and contracting said rod and bead. substantially as described.

3. The combination with a continuous rim, of a supporting plate secured thereto and provided with cuts therein, the said plate being bent to form a bead, a bent rod mounted in said bead, and means for expanding and contracting said rod and bead, and a felly band provided with an annular groove therein adapted to engage said bead, substantially as described.

4. The combination with a continuous rim. of a supporting plate secured thereto and provided with cuts therein, the said plate being bent to form a bead, a bent rod mounted in said bead, and a right and left hand screw for expanding and contracting said rod and bead, and a felly band provided with an annular groove therein adapted to engage said bead, substantially as described.

5. The combination with a continuous rim, of a laterally projecting supporting plate secured thereto and provided with cuts therein, the said plate being bent to form a laterally projecting bead, a bent rod mounted in said bead, means for expanding and contracting said rod and bead, and a felly band provided with an annular groove therein, adapted to engage said bead when in the contracted position, substantially as described.

6. The combination with a felly band, of a pair of continuous rims, laterally projecting supporting plates secured to said rims, the laterally projecting edge of each plate being bent to form a bead, and being provided with cuts therein, bent rods mounted in said beads, and means for expanding and contracting said rods and beads, with a felly band provided with grooves therein, adapted to engage said beads, substantially as described.

7. The combination with a felly band, of a pair of continuous rims, laterally projecting supporting plates secured to said rims, the laterally projecting edge of each plate being bent to form a bead, and being provided with cuts therein, bent rods mounted in said beads, and a right and left hand screw for expanding and contracting said rods and beads, with a felly band provided with grooves therein adapted to engage said beads, substantially as described.

In testimony whereof, I affix my signature, in presence of two witnesses.

MARC WOLFF.

Witnesses:
HERBERT D. JAMESON,
C. P. LIDDON.